(12) United States Patent
Benayoun et al.

(10) Patent No.: US 6,704,866 B1
(45) Date of Patent: *Mar. 9, 2004

(54) COMPRESSION AND ENCRYPTION PROTOCOL FOR CONTROLLING DATA FLOW IN A NETWORK

(75) Inventors: Alain Benayoun, Cagnes sur Mer (FR); Jacques Fieschi, Saint Laurent du Var (FR); Patrick Michel, LaGaude (FR); Jean-Francois Le Pennec, Nice (FR)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 12 days.

(21) Appl. No.: 09/187,097

(22) Filed: Nov. 5, 1998

(30) Foreign Application Priority Data

Jul. 11, 1997 (EP) .............................. 97480078

(51) Int. Cl.7 ................................. H04L 9/00
(52) U.S. Cl. .................... 713/151; 380/37; 380/269; 713/152; 713/153; 713/160; 713/200
(58) Field of Search .................. 380/37, 269; 713/151, 713/200, 152, 150, 153, 160

(56) References Cited

U.S. PATENT DOCUMENTS 3,858,240 A   12/1974  Golding et al. ............... 358/13
3,891,994 A    6/1975  Phillips et al. ................ 358/11
4,172,213 A *  10/1979 Barnes et al. ................. 178/22
4,212,028 A    7/1980  Drewery ...................... 358/11
4,290,105 A    9/1981  Cichelli et al. ............. 364/200
4,315,278 A    2/1982  Pasdera ....................... 358/16
4,459,677 A    7/1984  Porter et al. ................ 364/900

(List continued on next page.)

OTHER PUBLICATIONS

Perlman, Radia, Interconnections: Bridges and Routers, 1992, pp. 28–38, 373, Addison–Wesley, Reading, Massachusetts.

*Primary Examiner*—Gregory Morse
*Assistant Examiner*—Paul Callahan
(74) *Attorney, Agent, or Firm*—Cesari and McKenna, LLP (57) ABSTRACT

Process for controlling frames transporting data from a transmitting Terminal (DTE 1) to at least a receiving Terminal (DTE 2) through a plurality of consecutive nodes including a start access node (NODE 1) connected to said transmitting Terminal and at least an end access node (NODE 6) connected to said receiving Terminal and intermediary nodes (NODE 2 to NODE 5), with each data frame comprising one or several protocol layers respectively associated with one or several communication protocols of controlling the frame flow at each node; such a process consisting in adding to each data frame a Data Manipulation Layer (DML) defining the parameters necessary for managing the manipulation (compression and/or encryption) of each field of the data frame located after the DML, and adding to each data frame a Control message for transporting a control protocol defining new parameters to be used by some ones nodes for managing the communication flow through the consecutive nodes.

36 Claims, 5 Drawing Sheets

U.S. PATENT DOCUMENTS

| | | | |
|---|---|---|---|
| 4,491,861 A | 1/1985 | Sochor | 358/13 |
| 4,500,912 A | 2/1985 | Bolger | 358/31 |
| 4,564,915 A | 1/1986 | Evans et al. | 364/521 |
| 4,580,134 A | 4/1986 | Campbell et al. | 340/703 |
| 4,612,532 A | 9/1986 | Bacon et al. | 340/347 |
| 4,633,490 A | 12/1986 | Goertzel et al. | 375/122 |
| 4,644,389 A | 2/1987 | Nakagawa et al. | 358/28 |
| 4,707,729 A | 11/1987 | Bruno et al. | 358/13 |
| 4,736,287 A | 4/1988 | Druke et al. | 364/200 |
| 4,768,082 A | 8/1988 | Hiratsuka et al. | 358/13 |
| 4,802,220 A * | 1/1989 | Marker, Jr. | 380/33 |
| 4,847,677 A | 7/1989 | Music et al. | 358/13 |
| 4,876,541 A | 10/1989 | Storer | 341/51 |
| 4,905,297 A | 2/1990 | Langdon, Jr. et al. | 382/56 |
| 4,956,774 A | 9/1990 | Shibamiya et al. | 364/200 |
| 4,961,139 A | 10/1990 | Hong et al. | 364/200 |
| 5,003,299 A | 3/1991 | Batson et al. | 340/703 |
| 5,020,058 A | 5/1991 | Holden et al. | 370/109 |
| 5,032,987 A | 7/1991 | Broder et al. | 364/200 |
| 5,043,885 A | 8/1991 | Robinson | 364/200 |
| 5,086,469 A * | 2/1992 | Gupta et al. | 380/48 |
| 5,121,494 A | 6/1992 | Dias et al. | 395/600 |
| 5,121,495 A | 6/1992 | Nemes | 395/600 |
| 5,161,193 A * | 11/1992 | Lampson et al. | 380/49 |
| 5,258,983 A | 11/1993 | Lane et al. | 370/118 |
| 5,287,499 A | 2/1994 | Nemes | 395/600 |
| 5,319,682 A | 6/1994 | Clark | 375/122 |
| 5,335,345 A | 8/1994 | Frieder et al. | 395/600 |
| 5,381,145 A | 1/1995 | Allen et al. | 341/107 |
| 5,390,359 A | 2/1995 | Damerau | 395/800 |
| 5,406,281 A | 4/1995 | Klayman | 341/51 |
| 5,424,732 A | 6/1995 | Iyer et al. | 341/51 |
| 5,434,568 A | 7/1995 | Moll | 341/87 |
| 5,442,351 A | 8/1995 | Horspool et al. | 341/51 |
| 5,473,607 A | 12/1995 | Hausman et al. | 370/85.13 |
| 5,521,940 A | 5/1996 | Lane et al. | 375/240 |
| 5,627,533 A | 5/1997 | Clark | 341/51 |
| 5,701,301 A | 12/1997 | Weisser, Jr. | 370/428 |
| 5,844,508 A | 12/1998 | Murashita et al. | 341/51 |
| 5,970,095 A * | 10/1999 | Hauris et al. | 375/259 |

* cited by examiner

COMPRESSION AND ENCRYPTION PROTOCOL FOR CONTROLLING DATA FLOW IN A NETWORK

TECHNICAL FIELD

The present invention relates generally to the data flow control in a transmission network wherein the transported data can be compressed and/or encrypted depending upon the protocol used and recognized at each node of the network and in particular a method for controlling data flow in a network using a new compression and encryption protocol.

BACKGROUND ART

Nowadays, the exchange of information becomes more and more important in quantity, especially with the explosion of Internet. Furthermore, it has become necessary that most of data transported over a network are secured and protected.

It is therefore required to reduce the size of data by using compression algorithms, and also to reduce or even to suppress the capability of other users in the network of looking, reading and understanding the data by using encryption algorithms. Encryption may use the benefits of the compression to reduce the capability to unlock the encryption by reducing the predictability.

Data are generally encapsulated with protocols in frames or cells. Such protocols are becoming more and more complex and they introduce overhead. Besides, they need also be protected against external penetration for security. Accordingly, it is also required to use compression and/or encryption algorithms for protocols as for other data:

compression of the protocol may be used to reduce the overhead and facilitate the understanding in order to speed up the routing/switching over the network. Encryption may be used to reduce the visibility of the protocol (type of protocol, addresses . . . ) and the risk of intrusion.

Wide Area Networks (WAN) are the best candidates for compression and encryption although it may be interesting to use also compression and encryption on Local Area Networks (LAN) because WANs are either public networks or use public links which are very expensive and not under the protection of the entity transferring data. The three following cases are examples wherein compression and encryption should be used:

1. Customer networks are more and more sharing the infrastructure through common protocol such as Frame Relay or IP (Internet) which introduce security problems (confidentiality, access).

Data encryption allows the exchange of sensitive data over public access networks including Internet. Protocol header encryption allows to suppress the visibility of transactions/communications and of origin/destination address names.

2. WAN links are the slowest and most costly elements in a network. The complexity and overhead introduced by the protocols increasing over time (Ipv4 to Ipv6, Ethernet frame size, data base remote access . . . ) degrade the usability of the network.

Data and protocol header compression improves throughput over communication lines.

3. Separate compression/encryption devices for data and headers which exist today duplicate efforts, increase latency, and introduce compatibility problems. Furthermore, there is a need on local networks because the protocol or the user are not necessarily aware that the destination is within the LAN or accessed remotely. The location where data and/or protocols are compressed or encrypted are different. Generally, a compression/encryption on data is preferably performed on end devices at application or presentation layers, before a transparent end to end data transmission is performed. On the contrary, the protocol header needs to be compressed/encrypted at each routing node in order to be correctly routed. Generally, the type of compression/encryption required for data and protocol fields are not the same. There is no need for an intermediate node to have a clear view of the data field: it is less secure and spends unnecessary computing resources.

Some compression protocols are taking data fields into account while other ones are working exclusively on protocol headers but there is no common compatible existing protocol able to support multi-field compression/encryption control.

Using upper layers (application/presentation) is the easiest way to implement compression or encryption but it means that this function is only applied to that data itself and not to the various headers with their overhead. It means that it should be done on each system interfacing the network. Generally encryption of data is done by software such as ZIP, TAR . . . for compression or ViaCrypt or other similar code for encryption but involves personal activity and time/resource on each system and does not allow to perform compression at lower level. Encryption should always be done after compression. Inasmuch as Encryption randomizes the data, compression performed after encryption is not efficient. Its a good reason to move today encryption from upper layers to lower layers and after compression anyway.

All these drawbacks are reduced with implementation at lower layers (transport/network) especially if done by hardware to reduce compression/encryption time. At lower layers, it may be possible to compress/encrypt not only data fields but also header fields of the various protocols and to do it on the right order for better efficiency. Unfortunately, there is a limited capability on existing lower layers for the compression/encryption of the protocols which are specific and handle either header or data but never both using a similar encapsulation mechanism.

In addition to the reduced amount of data transmitted on the links, there are some advantages to improve both security and routing/switching time if it is not necessary to decompress each header at each network note. Some of the additional services are:

Protecting data against reading or modification from unauthorized person.

Protecting transaction against message suppression/insertion.

Verifying originator of messages.

SUMMARY OF THE INVENTION

Accordingly, the primary object of the invention is to provide a method of implementing a global encapsulation protocol able to support multiple types and fields of compression/encryption.

Another object of the invention is to provide a compression/encryption method applying to all protocols and allowing to increase the performance of the compression rate and the transmission delay.

Another object of the invention is to provide a new protocol able to split the various fields of a data frame by data and headers and a capability for each node to be able to manipulate, that is to compress (or decompress) and/or to encrypt (or decrypt) selected fields of the data frame.

Accordingly, the invention relates to a process for controlling frames transporting data from a transmitting Terminal to at least a receiving Terminal through a plurality of consecutive nodes including a start access node connected to the transmitting Terminal and at least an end access node connected to the receiving Terminal and intermediary nodes, with each data frames comprising one or several protocol layers respectively associated with one or several communication protocols of controlling the frame flow at each node. The process consists in adding to each data frame a Data Manipulation Layer (DML) defining the parameters necessary for managing the manipulation (compression and/or encryption) of each field of the data frame located after the DML, and adding to each data frame a Control message for transporting a control protocol defining new parameters to be used by some ones of the plurality of nodes for managing the communication flow through the consecutive nodes.

According to a characteristic of the invention, each data frame can be divided into a plurality of zones corresponding to the protocol layers located after the DML in the data frame or consecutive parts of these protocol layers and to the data block or consecutive parts of the data block, wherein each zone comprises a first sub-zone containing a manipulated data header (MDH) defining the parameters of the following compressed and/or encrypted data, and a second sub-zone containing data (MD) which have been compressed and/or encrypted according to the parameters defined in the first sub-zone.

According to another characteristic of the invention, the parameters defined in the Control message enable to determine the function assigned to each node, so that the node may have the function of:—Access Node interfacing directly the transmitting or receiving Terminal, such an Access Node generating the DML if it connected to the transmitting Terminal and removing the DML if it is connected to the receiving Terminal, Protocol Node for the nodes which may only have access to some manipulated headers but have no access to the data, and Network node for the nodes which have no access to headers or data the Frame supervisor.

The invention relates also to a Data Manipulation Layer (DML) added to a data frame transmitted from a transmitting Terminal to at least a receiving Terminal through a plurality of consecutive of at least a data transmission network (WAN) with the data frame comprising one or several protocol layers respectively associated with one or several communication protocols for controlling the frame flow at each node, and comprising a Frame supervisor defining the protocol to be used with the data included in the data frame, the flow identification (Flow ID) and the frame sequence number, a Control message defining new parameters to be used by some ones of the plurality of consecutive nodes for managing the communication flow in the network, and a DML frame header in front of the DML defining the contents of the DML.

BRIEF DESCRIPTION OF THE DRAWINGS

These and other features, objects and advantages of the invention will become apparent upon a consideration of the following detailed description of the invention when read in conjunction with the drawings in which.

DETAILED DESCRIPTION OF THE INVENTION

Figure 1:
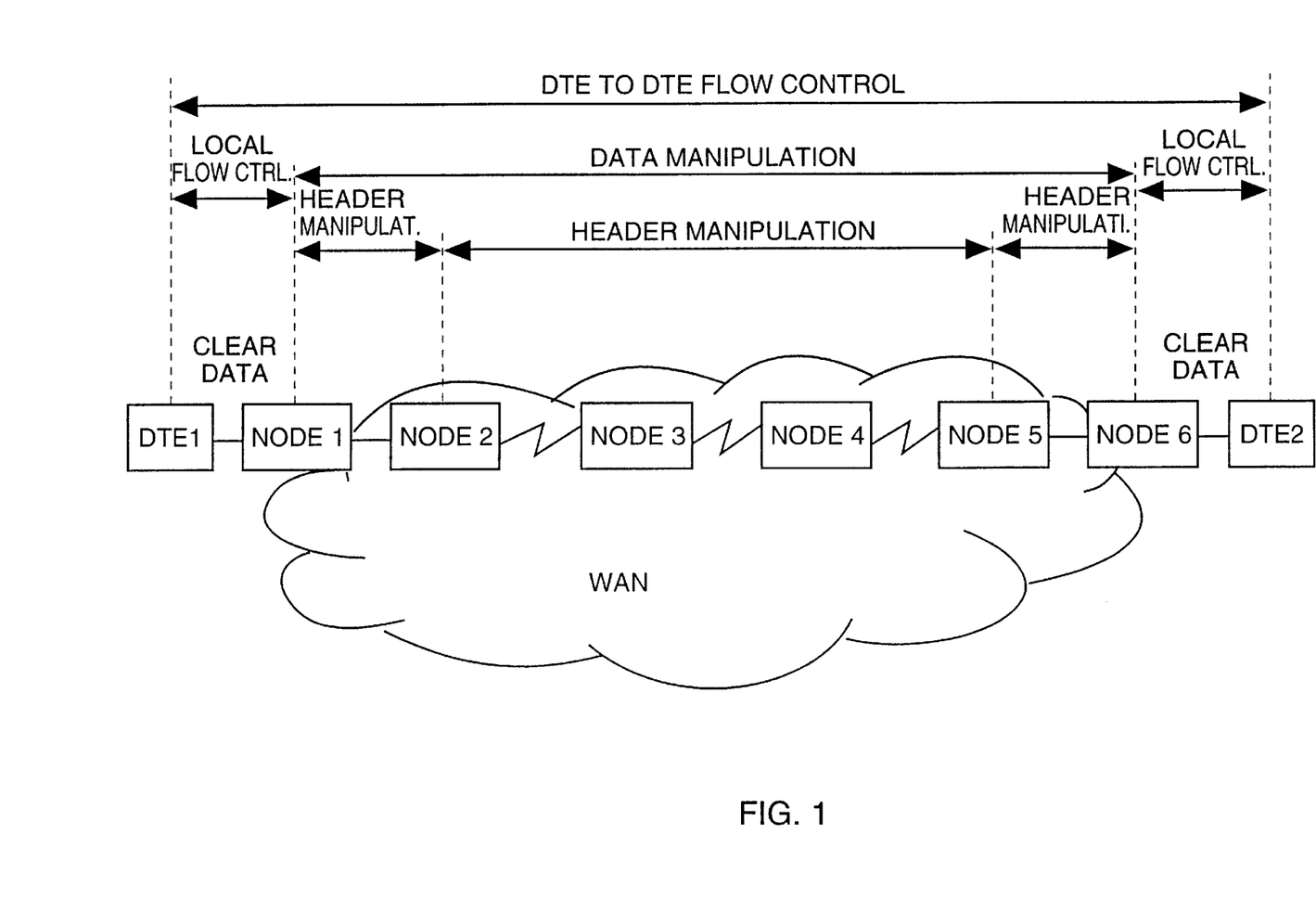
FIG. 1 shows a schematic block-diagram of a transmission path from a Terminal DTE 1 to a Terminal DTE 2 over a wide area network (WAN) wherein the invention may be used.

In a general way, the invention can be implemented in a wide area network (WAN) as illustrated in FIG. 1 for the transport of data frames between a transmitting Terminal (DTE 1) and a receiving Terminal (DTE 2), but could be also implemented in a local area network (LAN) or a large network composed of WANs and LANs. As shown in FIG. 1, DTE 1 transmits clear data to the first node accessing the network which transforms the clear data into compressed and/or encrypted data between NODE 1 and NODE 6. Reciprocally, the into compressed and/or encrypted data is transformed into clear data between NODE 6 and the receiving Terminal DTE 2.

The invention consists in adding a protocol layer in front of the existing protocols if supported by the network nodes or between the existing protocols in order to pass through the nodes that are not aware of the added protocol in order to coexist with the already installed protocols. Thus, it is possible to add the new protocol layer between the ATM protocol and the IP protocol or between the IP protocol and the TCP protocol or other upper layer protocols. In order to inform the upper layers of the presence of this new protocol, a mechanism such as a dedicated network layer protocol identifier is recommended.

The purpose of the added protocol is to define each field of the frame or cell, data as well as header, as being manipulated (compressed or encrypted or both). Thus, several compression and encryption protocols may be defined field by field. In the following description, the layer containing such a new protocol will be defined as the Data Manipulation Layer (DML).

The DML determines two main functions: a control protocol which defines the function of each node involved in a communication between a transmitting DTE and a receiving DTE, a DML protocol for encapsulating the data and providing pointers to all fields of the layer.

Data Manipulation Layer (DML) Protocol

Figure 2:
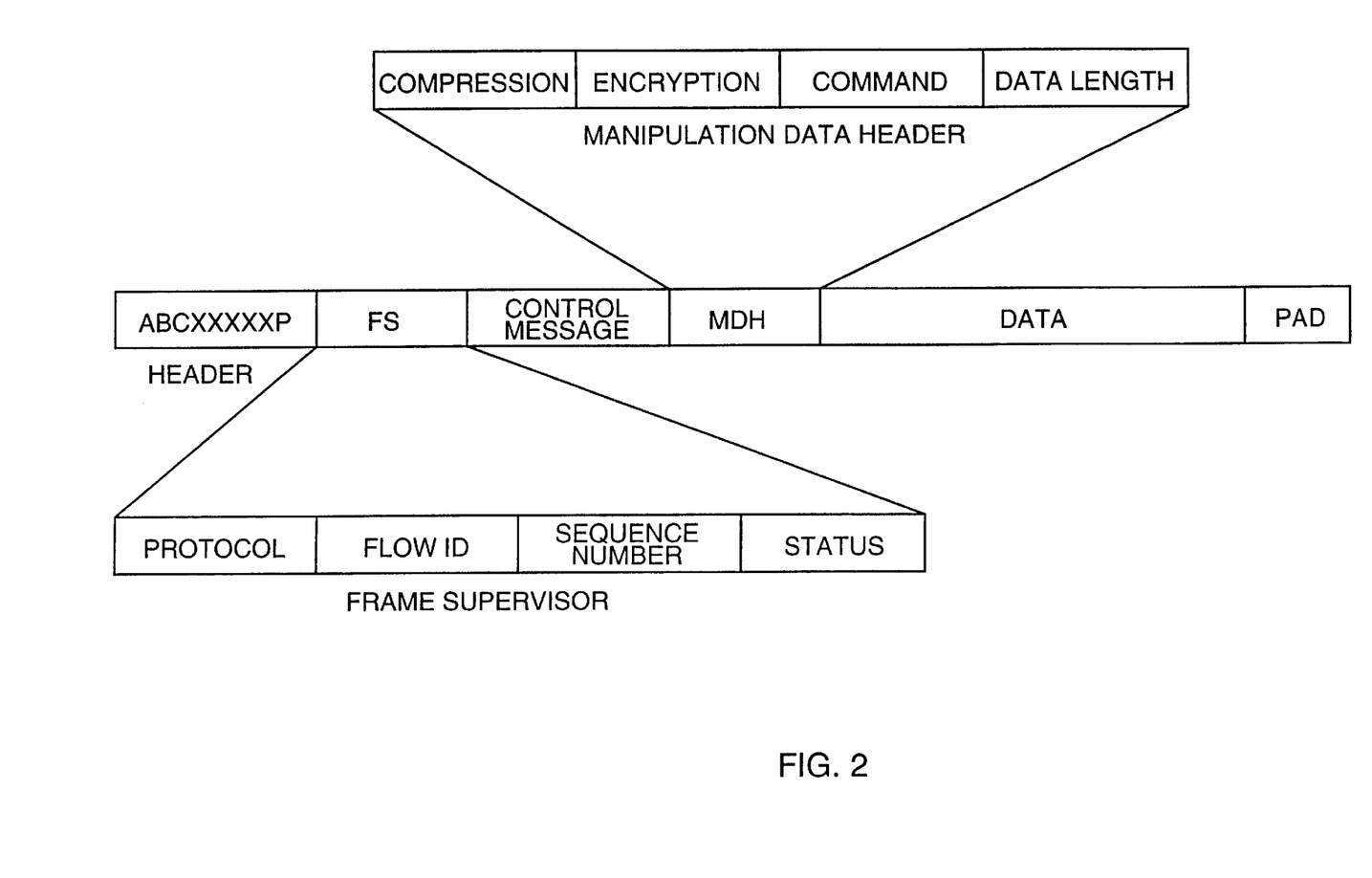
FIG. 2 shows schematically the structure of the Data Manipulation Layer (DML) according to a preferred embodiment of the invention.

The DML protocol is defined by several fields in the DML which are illustrated in FIG. 2. As pointers to each field are provided, each one may be handled separately. This allows to work separately on headers of protocols, the data block, or parts of the protocol headers or the data block.

The DML is composed of a Frame header determining the contents of the DML fields, a Frame supervisor (FS) a Control message defining the control protocol as described hereafter, a manipulated data header (MDH), a data block and a PAD necessary as words used for manipulated data (compressed and/or encrypted) are not necessarily aligned on bytes.

DML Header Format

The DML Frame header includes 3 bits ABC wherein:

A=1 when data are in manipulated mode (compressed and/or encrypted)

A=0 when data are not in manipulated mode

B=1 when there is a frame supervisor

B=0 when there is no frame supervisor

C=1 when there is a control message

C=0 when there is no control message

* 5 bits XXXXX indicating the number of bytes in the control message.

* P is the parity bit of the frame header.

Note that this way of formatting avoids from having 0 bits in fields dedicated to the Frame supervisor or to the Control message when they do not exist in the DML. However, another way would be to have always a Frame supervisor or a Control message even if they contain no significant bits.

Hereunder are the 8 cases corresponding to the different values of the ABC bits:

ABC=000

Data are not manipulated, and there are no Frame supervisor and no Control message. It is the way to handle transparent data which are neither compressed nor encrypted but which are using the same logical channel as manipulated data.

ABC=001

Data are not manipulated, and there is no Frame supervisor. There is a Control message the length of which is given by the 5 bits XXXXX. Such a Control message generated without a Frame supervisor indicates a global message that concerns all protocols involved. It can be used to define the size and contents of each Frame supervisor that may be used. It can be also used for the global setup of nodes involved in the transmission process.

ABC=010

Data are not manipulated, there is no Control Message and there is a Frame supervisor. As explained in detail hereafter, the Frame supervisor defines the protocol of the data included in the frame, indicates the flow identification and the sequence number identifying the sequence of the frame within this flow identification.

ABC=011

Data are not manipulated. There are both a Frame supervisor and a Control message. The length of the Control message is given by the 5 bits XXXXX. Such a Control message generated with a Frame supervisor indicates a message which relates only to the protocol defined in the Frame supervisor. Additionally, the Control message may concern only the flow identification defined in the Frame supervisor.

ABC=100

Data are compressed and/or encrypted. But there are no Frame supervisor and no Control message. Such a case corresponds to a data transmission between two Terminals which have defined a single protocol to be used in the transmission.

ABC=101

Data are compressed and/or encrypted. There is no Frame supervisor, but there is a Control message. Such a case is similar to the preceding one, except that a Control message is used to setup or to control the operation of the transmission nodes.

ABC=110

Data are compressed and/or encrypted. There is a Frame supervisor, but no Control message. After the frame supervisor, is included a manipulated data header (MDH) as illustrated in FIG. 2, which defines the characteristics of the compressed and/or encrypted data which follow the MDH field in the frame.

ABC=111

Data are compressed and/or encrypted, and there are both a Frame supervisor and a Control message.

Frame Supervisor Format

As illustrated in FIG. 2, the Frame supervisor includes:

a Protocol field (8 bits) defining up to 246 protocols such as Ipv4, Ipv6, X.25, HDLC, Frame Relay, PPP or sub-protocols, or protocols over other protocols.

a Flow ID field (8 to 24 bits) identifying the transmission flow to which belongs the frame. It is used in addition to the protocol in order to simplify the routing/switching on those nodes that may not access to the protocol header.

a Sequence number field (4 to 8 bits) which is used to perform transmission error tracking or to synchronize aggregate flows using different paths in the network.

a Status field (4 to 16 bits) which is used for error management such a ½ window reached, ¼ error in sequence number etc.

Note that other optional additional fields could be included in the Frame supervisor such as lifetime, segmentation or checksum fields.

Manipulated Data Header Format (MDH)

As illustrated in FIG. 2, the manipulated data header contains the following fields:

a Compression field (3 bits) defining up to 8 compression modes which could be supported simultaneously on one Flow ID. The Compression type may be V.24bis, LZS . . .

an Encryption field (3 bits) defining up to 8 encryption modes which could be supported simultaneously on one Flow ID. The encryption type may be RSA, PGP, DES, IDEA, RC4 . . .

a Command field (2 to 8 bits) defining simple commands (ACK, RESET, Intermediate Init) or commands with additional fields (CRC check, dictionary update . . . )

a Data length field (6 or 14 bits) composed of one bit defining a short data length field (5 bits for 32 bytes) or a long data length field (13 for 8 Kbytes) followed by 5 or 13 bits.

Figure 3:
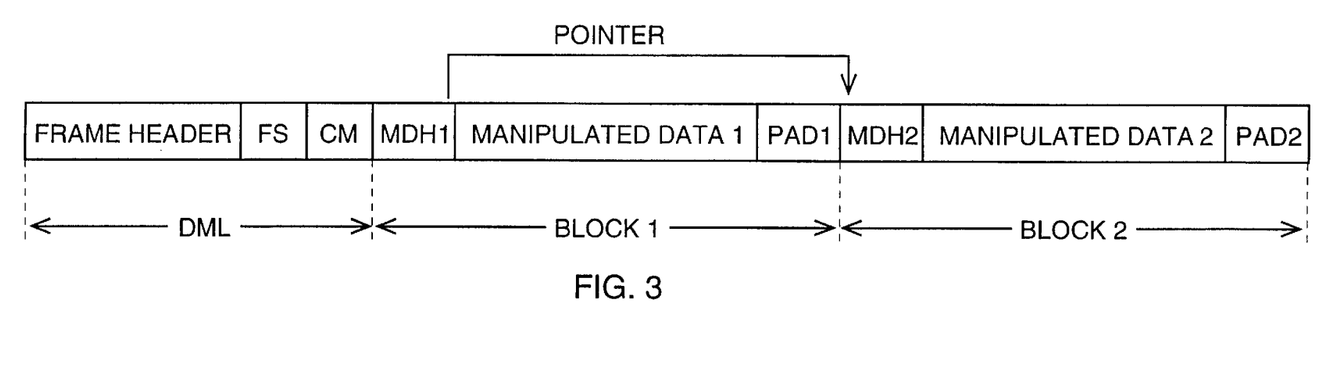
FIG. 3 shows schematically the structure of a data frame wherein protocol headers or data fields are divided into blocks for which different manipulation protocols may be used in accordance with the invention.

Note that each field of the frame (header or data) can be divided into several fields controlled by different protocols defining whether and how the corresponding field is compressed and/or encrypted. In such a case, there are several manipulated blocks in the frame as illustrated in FIG. 3, each block including a manipulated data header (MDH), a manipulated data (MD) and a PAD. Thus, in FIG. 3, there are two blocks. However, the number of blocks within a frame is not limited as they are chained together (for example, MDH 1 points to MDH 2).

Note that a block could be used to compress and/or encrypt the protocol header whereas the data could be compressed and/or encrypted separately.

Data Manipulation Layer (DML) Building

The DML which is generated by the first network node (Access node) being directly connected to the transmitting Terminal, can be considered in several situations:

setup and initialization of the Network. Used when information are requested and answered generally by using the control protocol. In this step and especially at global level, the use of the additional fields is limited (MDH, MD) as they are not completely defined and checked. Only default settings may be used at that time.

Once a protocol is defined and default links are established, further fields of the DML may fully be used under this protocol allowing data transfer protected and encrypted if necessary between end devices (DTEs) or between nodes themselves by using control messages within a protocol.

The number of MDH/MD blocks depends really on the incoming data structure, the type of protocol and the type of routing/switching function to perform in the path. Additionally if, for example, firewalls are implemented within the network which will look at upper layer protocol fields such as TCP, HTTP, FTP . . . there is a need to put these headers in dedicated MDH/MD blocks in order to isolate them one side from the data and on the other side from lower layer protocols such as IP which will be used by intermediate protocol nodes that do not need to look at TCP or similar level of protocol.

Furthermore, there is an interest to offer the capability within one frame to split the data in several data fields insofar as a single data frame may handle different kind of data: data, voice, video. Each one does not support the same kind of manipulation which leads to use corresponding manipulation mechanisms. In addition, it may be found that some part of the data is already compressed or encrypted which prevents to use efficiently any kind of manipulation on this part of data. Putting this part of data in specific MDH/MD block without manipulation while the remaining part is still compressed and/or encrypted improves significantly the performance of the global manipulation.

Control Protocol

The control protocol is transported between nodes in control messages. It is used to setup these nodes along the network, to check for error, proceed to recovery and reset the nodes.

The control protocol works at three different levels:

1. The global level, either logical or physical, which may include several connections using different protocols:

At global level, the following elements may be exchanged
Public Key exchange with certification in order to enable protected information exchange between the nodes.

Frame supervisor definition, contents and size of the fields.

Data Manipulation protocols such as encryption protocols and compression protocols with their characteristics. This needs an exchange of information starting by a request from the Access node which has to know the capability of all the nodes in a network. Note that the intermediate nodes do not need to perform this kind of requests as they are not establishing connection. They will just answer to Access node requests.

Secret encryption keys. These keys as the other information transported through the control protocol, may be themselves encrypted using a public key method such as RSA. These secret keys allows a better encryption method for large data transfers; they offer better performance than Public/private key methods. But to transmit these keys, the preferred solution is to exchange the public keys between the nodes in a first time. Then a node sends the secret key encrypted by the public key given by the destination. The receiving node can decrypt by using its private key corresponding to the public key at the disposal of the sending node. Authentication is also used as a common way to check that the provider of the key is the regular one. Either an authentication code is set (built in) in all the nodes in the network or each public key is put in a common server that will provide public keys to each requesting node.

2. The protocol level which may include several features

At this level are defined the network protocols such as TCP, IP, Frame Relay, OSPF, RIP, SNMP, ATM, X.25 . . . that are supported in the network by all the nodes or a limited number of nodes.

The characteristics of each of the network protocols are defined so as to include the capability for each node to route or switch the protocol.

Default Flow ID are assigned such as connection-less IDs, management Ids.

The security to apply by default to each protocol.

The characteristics of various data compression protocols including their initialization: for example exchange of the starting compression tables/dictionaries if not empty.

The number of Flow IDs supported by the protocol which leads to the length of the ID-Flow field.

In the preferred embodiment of the invention, all the parameters set at global and protocol levels are put in a multi-protocol table which includes the following fields:

Node names, type.

Node addresses by protocol.

Capability of the node for data manipulation: list of algorithm/protocols supported with pointer to their specific tables/keys.

Routing and switching facilities by protocol.

3. The connection level identified by a flow ID

The characteristics of each connection is then defined, connection by connection, when there is a need or a request to start one connection. A connection is always started by an Access Node.

To manage all the connections and associated Flow-IDs (at least one Flow-ID by connection) an additional Flow-ID table is implemented at node or port level, by protocol in order to manage the connections. The characteristics of each connection including the parameters related to its Quality of Service, max path length, security . . . are incorporated in this table. When the call is completed, Flow-IDs are released and can be reused. An empty field list is therefore maintained.

A similar table can be used on intermediate nodes where Flow-IDs may have to be swapped from one port to another. In order to achieve that, an additional field is added on the above table giving the next Flow-ID to use and the destination port. Flow-ID swapping is used to reduce the number and size of IDS by link/port. Flow-ID swapping initialization and change is performed using the control protocol at connection level.

Transmission Flow

As illustrated in FIG. 1, the data transmission between a transmitting Terminal and a receiving Terminal using the principles of the invention can involve a plurality of nodes. These DML nodes may have different functions which divide them into three types: Access, Protocol or Network nodes 1. Access Nodes:

These nodes interface directly the Terminal. They may be also integrated within the Terminal. They get and send clear data on one side from various protocols and generate on the other side the proposed protocol having multiple fields compressed and/or encrypted. They can code and decode data and header compression/encryption on the protocols they control. Node 1 and 6 are example of Access nodes.

An Access node is the only node where the DML is generated. It establishes connection through the network up to the final Access node destination which will remove the DML layer.

An access node needs to have a full view of the network to find the most appropriate route. It builds the route table and updates the various nodes in the network through the control protocol to perform the defined forwarding function (routing, switching at the appropriate level) on each node.

2. Protocols Nodes

These nodes can only decode some of the header compression/encryption but have no access to the data. They can interface Access or Network nodes or standard equipment/networks to reuse standard protocol encapsulation but the data will remain protected until a node having Access node functions (data decompression/deencryption) is reached. Nodes 2 and 5 are example of Protocol nodes A Protocol node is able to understand a DML frame on its receive side and can access to some or all the headers which means that it can understand and decode the Manipulated Data Header (MDH) and decrypt and/or decompress the associated data which is in fact a network protocol header such as Frame-Relay or IP or IP+TCP . . .

On the other side (transmit side), a protocol node can perform the reverse function after having routed or switched the frame at the appropriate level. A DML is rebuilt using the same structure with updating if necessary of the various headers including the data contents of the header and its associated MDH.

3. Network Nodes

These backbone nodes have access neither to the protocol header nor to the data. They have to route or switch at the Flow-ID level. They manage virtual circuits knowing their routing characteristics up to the next Protocol node but have no idea of the final destination and cannot view the data. Nodes 3 and 4 are example of Network nodes.

A Network node may only switch or route using the Frame supervisor fields which means that it should refer to the ID to check within its local routing table to which port it should forward the frame and on which flow-ID (if this one is changed).

The type of node (Access, Protocol or Network) is a definition which applies either to the full device or to a port or list of ports, or to a protocol or list of protocols, or Flow-IDs. This means that a device may be simultaneously Access node for some links, Protocol node for other and Network node only for the remaining links which have not been assigned to higher privilege.

It is possible to find Protocol nodes inside a cloud of Network nodes, and Access nodes inside a cloud of Protocol nodes. The next node in a path is not necessarily a node of the same level or a node of the level just above or under its level. Any combination is possible. An Access node includes all rights and privileges of Protocol and Network nodes while a Protocol node includes the rights and privileges of a Network node.

Coexistence of DML Nodes with Standard Routing Nodes

Figure 4A:
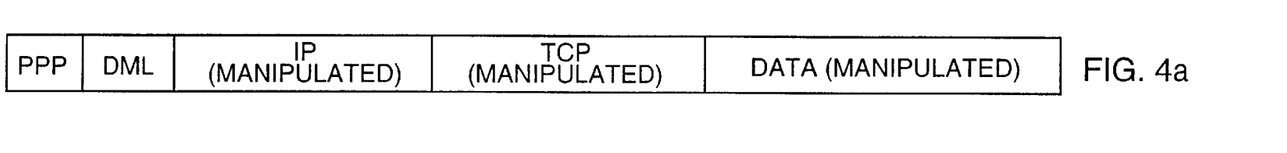
FIGS. 4a, 4b, and 4c represent the structure of the data frame wherein the DML which is not located in front of the frame may be shifted after other protocol layers.

There is no problem to implement the principles of the invention defining the DML nodes as explained above, within a network wherein there are standard routing nodes. For example, it can be assumed that a DML has to be set up just after a link protocol PPP as illustrated in FIG. 4a. In such a case, all the upper layers including IP header, TCP header and data themselves can be compressed and/or encrypted.

Figure 5:
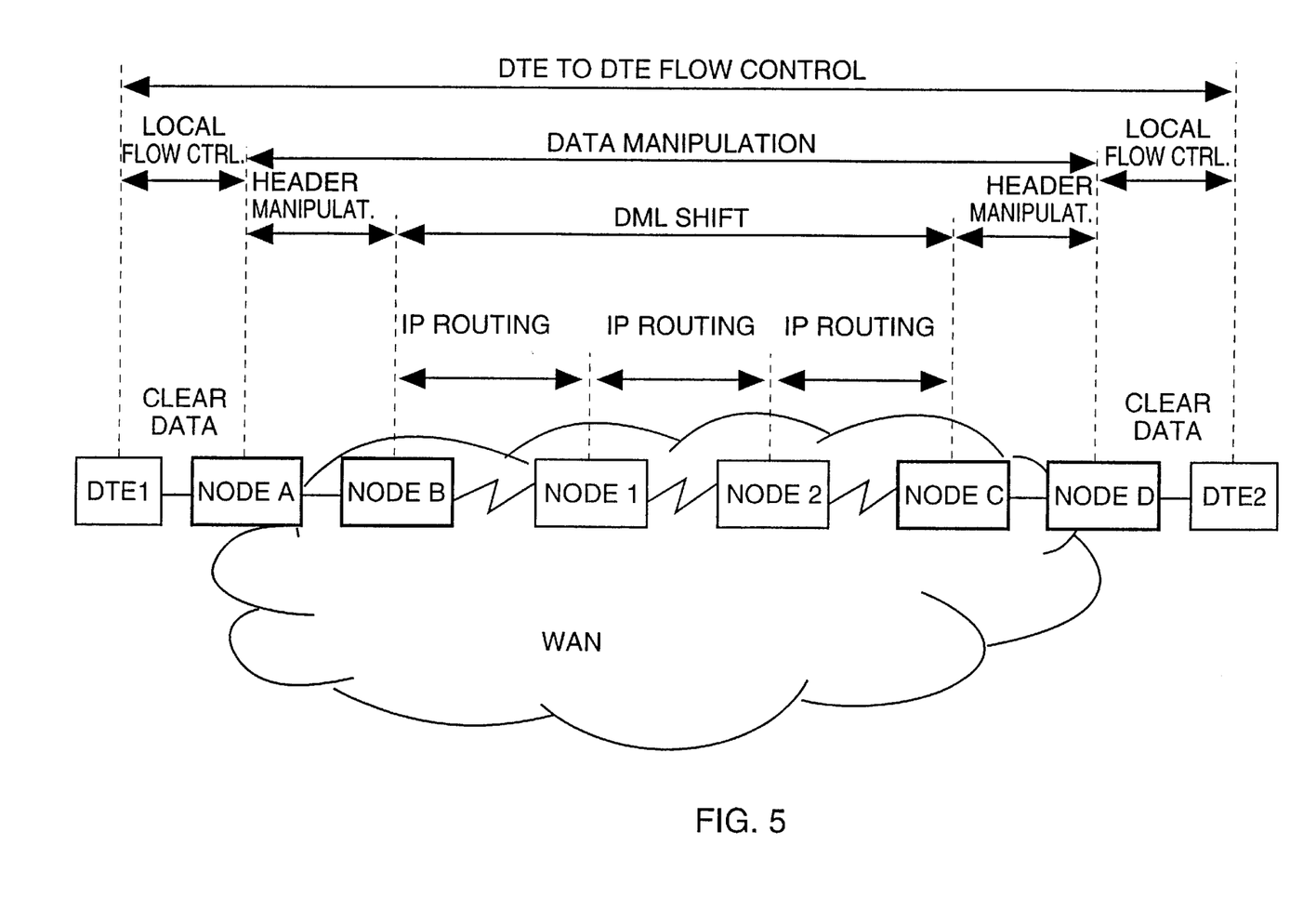
FIG. 5 shows a schematic block-diagram of a transmission path wherein DML nodes coexist with standard routing nodes.

This above case can be illustrated by FIG. 5. As NODE 1 which is a standard routing node, is not able to understand the DML protocol, there is a need that a protocol (PPP) which can be routed over the network, be located in front of the frame. This applies also between NODE 2 which is a standard routing node and NODE C, and of course, between NODE 1 and NODE 2.

Figure 4B:
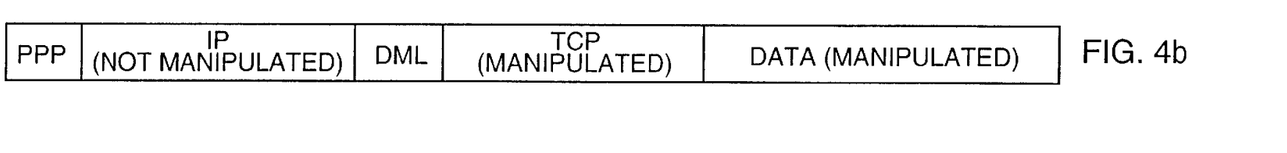

A way to solve the interconnection with standard routing nodes in the case of FIG. 5 is to shift the DML to the right while the IP header is used without being manipulated as illustrated in FIG. 4b. But this solution has the drawback to increase the number of bytes to be used when it is necessary to decompress the IP header and generally also to decrypt the IP header. Note that the IP header has to set as next layer field a value that NODE C can detect to start the DML processing.

Figure 4C:
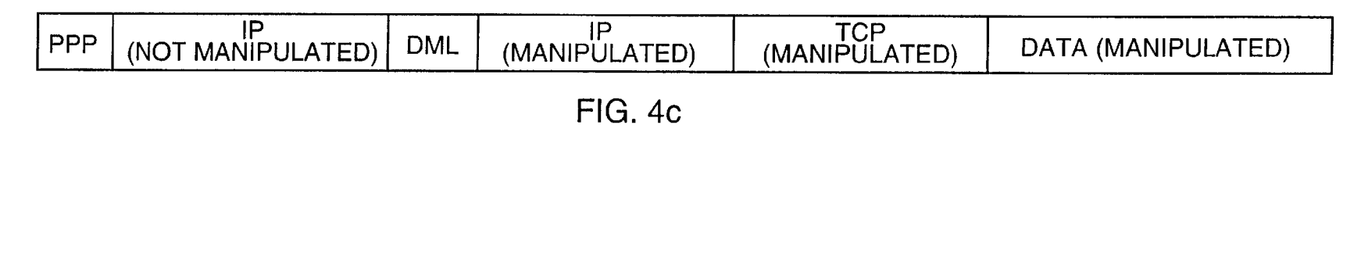

A better approach would be to use the frame structure illustrated in FIG. 4c, where the IP header not manipulated has NODE B as source address and NODE C as destination address. This will result in an encapsulation pipe shared by several users to pass through NODE 1 and NODE 2. It looks like a tunneling function which will protect the identification of real source and destination and avoid network penetration by not authorized people.

Figure 6:
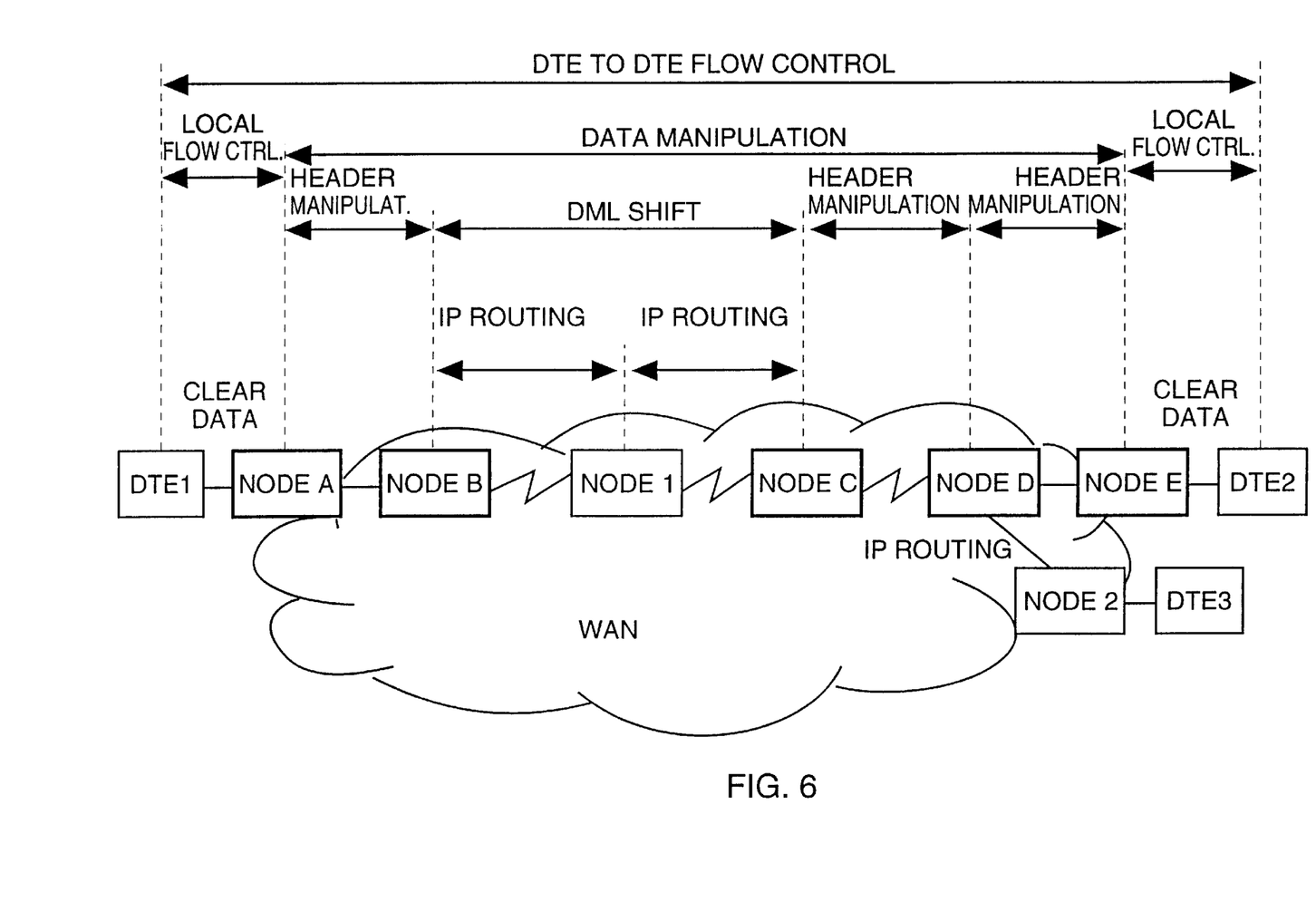
FIG. 6 shows a schematic block-diagram of a multipoint transmission configuration wherein a DML node can be an Access node or a Protocol node depending upon the destination of the path.

FIG. 6 shows an example of multipoint configuration wherein one of the destination is a standard routing node (NODE 2). The transmission path from DTE 1 to NODE D is similar to the above case in reference to FIG. 5. At NODE D, the DML may be used to forward data either to NODE E and DTE 2 or to NODE 2 and DTE 3. In the latter path, NODE D must be able to decompress and/or decrypt all layers including or not the data (depending on the capability of NODE 2); therefore, NODE D will be both an Access node for DTE 3 even though it is not directly connected thereto and a Protocol node for DTE 2.

What is claimed is:

1. Process for controlling frames transporting data from a transmitting Terminal (DTE 1) to at least a receiving Terminal (DTE 2) through a plurality of consecutive nodes including a start access node (NODE 1) connected to said transmitting Terminal, at least an end access node (NODE 6) connected to said receiving Terminal and optional intermediary nodes (NODE 2 to NODE 5), with each data frame comprising one or more protocol layers respectively associated with one or more communication protocols for controlling the frame flow at each node;

said process comprising:
a) adding to each data frame a Data Manipulation Layer (DML) defining the parameters necessary for managing the manipulation (compression and/or encryption) of a plurality of fields of said data frame, the DML providing each of said plurality of fields a manipulated data header (MDH), each MDH associated with a field and defining a manipulation mode for said associated field, such that each of said plurality of fields may be manipulated separately; and b) adding to each data frame a Control message for transporting a control protocol defining new parameters to be used by some ones of said plurality of nodes for managing the communication flow through said plurality of consecutive nodes.

2. Process according to claim 1 further comprising:

including said Control message as a field of said Data Manipulation Layer (DML).

3. Process according to claim 1 further comprising:

including in said Data Manipulation Layer (DML) a DML frame header defining the contents of said DML after said DML frame header.

4. Process according to claim 3, further comprising:

including in said DML frame header a field defining the length of said Control message.

5. Process according to claim 3, further comprising:

including in said DML frame header a bit indicating whether said DML includes a Control message.

6. Process according to claim 2, further comprising:

including in said DML frame header a bit indicating whether the contents of said data frame following said DML header are compressed and/or encrypted.

7. Process according to claim 1, further comprising:

including in said DML
 a Frame supervisor defining the protocol used with the data included in said data frame,
 a flow identification (Flow ID), and
 a frame sequence number.

8. Process according to claim 7, further comprising:

assigning, by said Control message, functions to each of said plurality of nodes, so that said nodes may have the function of:
 Access Node interfacing directly with said transmitting or receiving Terminal, said Access Node generating said DML if it is connected to said transmitting Terminal and removing said DML if it is connected to said receiving Terminal,
 Protocol Node for those nodes which may only have access to some manipulated headers but have no access to the data, and
 Network node for those nodes which have no access to headers or data but have to route said data frame in the network by using said Flow ID included in said Frame supervisor.

9. Data Manipulation Layer (DML) according to claim 8, wherein said DML frame header further comprises:

a field defining the length of said Control message.

10. Data Manipulation Layer (DML) according to claim 8, wherein said DML frame header contains a bit determining whether the contents of said data frame following said DML are compressed and/or encrypted.

11. A computer readable media, comprising:

said computer readable media having instructions for execution in a computer written thereon for the practice of the process of claim 1.

12. Electromagnetic signals propagating on a computer network, comprising:

said electromagnetic signals containing information having instructions for execution on a computer for the practice of the process of claim 1.

13. A Data Manipulation Layer (DML) added to a data frame transmitted from a transmitting Terminal (DTE 1) to at least a receiving Terminal (DTE 6) through a plurality of consecutive nodes (NODE 2 to NODE 5) of at least a data transmission network (WAN) with said data frame comprising one or more protocol layers respectively associated with one or more communication protocols for controlling the frame flow at each of said nodes;

said DML comprising:
 a Frame supervisor defining the protocol to be used with the data included in said data frame, and assigning a flow identification number (Flow ID) and a frame sequence number;
 a Control message defining new parameters to be used by some ones of said plurality of consecutive nodes for managing the communication flow in said network;
 a DML frame header indicating the presence of a plurality of manipulated (compressed and/or encrypted) data fields in said data frame; and
 a plurality of manipulated data headers (MDHs), each MDH associated with a manipulated data field of said plurality of manipulated fields and defining a manipulation mode for said field, such that each of said plurality of manipulated fields may be manipulated separately.

14. A method for controlling frames transporting data from a transmitting terminal (DTE 1) to a receiving terminal (DTE 2), comprising:

adding to each data frame a data manipulation layer (DML) defining the parameters necessary for managing the manipulation (compression and/or encryption) of a plurality of fields of said data frame, the DML providing each of said plurality of fields a manipulated data header (MDH), each MDH associated with a field and defining a manipulation mode for said associated field, such that each of said plurality of fields may be manipulated separately; and, adding to each data frame a control message for transporting a control protocol defining new parameters to be used by an intermediate node for managing the communication flow from DTE 1 to DTE 2.

15. The method of claim 14, wherein said managing the manipulation of each field further comprises:

encrypting at least one field of said frame.

16. The method of claim 14, wherein said managing the manipulation of each field further comprises:

compressing at least one field of said frame.

17. The method of claim 14 further comprising:

defining manipulation of a protocol header.

18. The method of claim 14 further comprising:

defining manipulation of data following a protocol header.

19. The method of claim 14 further comprising:

including in said DML a field defining a length of said control message.

20. The method of claim 14 further comprising:

including in said DML a bit determining whether said DML includes a control message.

21. The method of claim 14 further comprising:

including in said DML a bit determining whether a portion of said data frame following said DML is compressed.

22. The method of claim 14 further comprising:

including in said DML a bit determining whether a portion of said data frame following said DML is encrypted.

23. The method of claim 14 further comprising:

including in said DML a bit determining whether a portion of said data frame following said DML is compressed and encrypted.

24. The method of claim 14 further comprising:

including in said DML a Frame Supervisor, said Frame Supervisor defining the protocol to be used with the data included in said data frame, a flow identifier (Flow ID) and a frame sequence number.

25. The method of claim 14 further comprising:

defining said parameters in said control message to enable intermediate nodes between DTE 1 and DTE 2 to respond to said DML and control message with the function of;

Access Node interfacing directly with said transmitting terminal, said Access Node generating said DML if it is connected to said transmitting terminal and removing said DML if it is connected to said receiving terminal,     Protocol Node for those nodes which may only have access to some manipulated headers but have no access to the data, and     Network Node for those nodes which have no access to headers or data but have to route said data frame in the network by using a Flow ID included in a Frame Supervisor.

26. The method of claim 14 further comprising:

transporting said frame by use of a flow identifier (Flow ID);

identifying a protocol header in said frame by a multi-bit field, and manipulating said protocol header to be compressed and/or encrypted.

27. The method of claim 14 further comprising:

identifying an encryption mode with a multi-bit field to identify one of a plurality of encryption types for encrypting a field of said frame.

28. A method of transferring a data frame from a transmitting data terminal to a receiving data terminal, said data frame including a plurality of fields, comprising:

launching said data frame by said transmitting data terminal to a first access node using a standard protocol;

receiving said data frame by said first access node;

manipulating selected fields of said plurality of fields to compress and/or encrypt clear data in said selected fields, each field compressed or encrypted according to one of a plurality of compression and/or encryption modes;

providing each frame with a data manipulation layer (DML) at said first access node, said DML providing each of said plurality of selected fields a manipulated data header (MDH), each MDH associated with a field and describing said compression and/or encryption mode used for said associated field;

transferring, in response to said Flow ID, said frame to a second access node;

receiving said frame by said second access node;

manipulating said frame in response to said DML, said second access node decrypting and/or decompressing said selected manipulated fields to reproduce said clear data and to create a reproduced frame; and     sending said reproduced frame by said second access node to said receiving data terminal.

29. The method of claim 28 further comprising:

selecting one or more of said selected fields as data fields of said frame.

30. The method of claim 28 further comprising:

selecting one or more of said selected fields as protocol header fields of said frame.

31. The method of claim 28 further comprising:

receiving, in response to said flow ID, said frame by an intermediate node;

obtaining access, in response to said DML, by said intermediate node to a selected field of said frame.

32. An Access Node, comprising:

means for receiving a data frame having clear data, from a first terminal, said data frame including a plurality of fields, each field containing clear data, said data frame addressed to a second terminal;

means for manipulating selected fields of said plurality of fields in said data frame to compress and/or encrypt said clear data in said selected fields, each field compressed and/or encrypted according to one of a plurality of compression and/or encryption modes;

means for adding to said data frame a data manipulation layer (DML), said DML providing each of said plurality of selected fields a manipulated data header (MDH), each MDH associated with a field and describing said compression and/or encryption mode used for said associated field;

means for adding to each data frame a control message for transporting a control protocol defining new parameters to be used by an intermediate node for managing the communication flow from the first to the second terminals;

means for sending through a computer network said frame having manipulated data.

33. An access node as in claim 32, further comprising:

means for receiving a data frame having a DML from said computer network, said data frame including a plurality of fields, selected fields containing manipulated data and each selected field associated with a MDH, said data frame addressed to said first terminal;

means, responsive to said DML of said data frame, for manipulating each of said manipulated fields in accordance said associated MDH to reproduce a clear data frame;

means for sending said clear data frame to said first terminal.

34. A computer readable media, comprising:

said computer readable media having instructions for execution in a computer for practice of the method of claim 14 or claim 28.

35. Electromagnetic signals propagating on a computer network, comprising:

said electromagnetic signals carrying information, said information having instructions for execution in a computer for practice of the method of claim 14 or claim 28.

36. A method for controlling frames transporting data from a transmitting terminal to a receiving terminal, each frame having a plurality of fields, comprising:

adding to each data frame a data manipulation layer (DML) header indicating that one or more fields of the frame located after the DML header are manipulated (compressed and/or encrypted);

adding to each of a plurality of selected fields located after the DML header a manipulated data header (MDH), each MDH associated with a field and defining a data manipulation mode for use with the associated field, such that each selected field may be manipulated separately according to a different manipulation mode; and transmitting said data frame, said data frame having said DML header and said MDHs.

* * * * *